US007381136B2

(12) United States Patent
Seelig et al.

(10) Patent No.: US 7,381,136 B2
(45) **Date of Patent: *Jun. 3, 2008**

(54) TELEPHONE GAMING DEVICE

(75) Inventors: Jerald C. Seelig, Absecon, NJ (US); Lawrence M. Henshaw, Pleasantville, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 862 days.

This patent is subject to a terminal disclaimer.

(21) Appl. No.: 10/309,738

(22) Filed: Jan. 30, 2003

(65) Prior Publication Data

US 2003/0100368 A1 May 29, 2003

Related U.S. Application Data

(62) Division of application No. 09/969,172, filed on Oct. 1, 2001, now Pat. No. 6,899,329.

(51) Int. Cl.
*A63F 9/24* (2006.01)
*A63F 13/00* (2006.01)

(52) U.S. Cl. ............................ 463/41; 463/16; 463/20; 463/40; 273/138.1; 273/138.2; 379/93.13

(58) Field of Classification Search ............ 463/16–22, 463/25–28, 30–34, 40–43, 1, 9; 273/138.1, 273/139, 143 R, 138.2; 379/93.13, 93.23
See application file for complete search history.

(56) References Cited

U.S. PATENT DOCUMENTS

| | | | | | |
|---|---|---|---|---|---|
| 4,926,255 | A * | 5/1990 | Von Kohorn | ................ | 725/23 |
| 4,996,705 | A * | 2/1991 | Entenmann et al. | .......... | 463/17 |
| 5,108,115 | A * | 4/1992 | Berman et al. | ................ | 463/9 |
| 5,186,471 | A * | 2/1993 | Vancraeynest | ............... | 463/41 |
| 5,218,631 | A * | 6/1993 | Katz | ........................... | 463/41 |
| 5,273,288 | A * | 12/1993 | Teshima et al. | .............. | 463/41 |
| 5,349,633 | A * | 9/1994 | Katz | ....................... | 379/88.09 |
| 5,608,785 | A * | 3/1997 | Kasday | .................... | 379/93.13 |
| 5,793,846 | A * | 8/1998 | Katz | ....................... | 379/93.02 |
| 5,907,604 | A * | 5/1999 | Hsu | ...................... | 379/142.06 |
| 6,016,338 | A * | 1/2000 | Bansal et al. | ............ | 379/93.13 |
| 6,139,431 | A * | 10/2000 | Walker et al. | ................ | 463/20 |
| 6,151,387 | A * | 11/2000 | Katz | ....................... | 379/93.13 |
| 6,263,054 | B1 * | 7/2001 | Haefliger | ................. | 379/93.13 |
| 6,278,773 | B1 * | 8/2001 | Perlman et al. | .......... | 379/93.23 |
| 6,512,415 | B1 * | 1/2003 | Katz | ....................... | 379/88.22 |
| 6,575,829 | B2 * | 6/2003 | Coleman et al. | .............. | 463/20 |
| 6,682,427 | B2 * | 1/2004 | Wolinsky | ..................... | 463/41 |
| 6,837,791 | B1 * | 1/2005 | Ramsey et al. | ............... | 463/42 |

(Continued)

*Primary Examiner*—Xuan M. Thai
*Assistant Examiner*—Meagan Thomasson
(74) *Attorney, Agent, or Firm*—Ian F. Burns & Associates

(57) ABSTRACT

A gaming device for playing a game by a game player. The gaming device allows the game player to place a telephone call. A controller generates a prize. Several images of persons who may receive the telephone call are displayed to the game player. The telephone call is placed to one of the images. The prize is announced by the selected image to the game player. A second telephone call is placed to a telephone number in order to select a multiplier. The controller generates the multiplier. The multiplier is the last digit of the telephone number. The prize is multiplied by the multiplier to obtain a total prize.

5 Claims, 7 Drawing Sheets

U.S. PATENT DOCUMENTS

| | | | | |
|---|---|---|---|---|
| 6,899,329 | B2 * | 5/2005 | Seelig et al. | 273/139 |
| 6,955,601 | B2 * | 10/2005 | Seelig et al. | 463/20 |
| 7,063,619 | B2 * | 6/2006 | Wolinsky | 463/41 |

* cited by examiner

TELEPHONE GAMING DEVICE

CROSS REFERENCES TO RELATED APPLICATIONS

This application is a divisional application of U.S. non-provisional application Ser. No. 09/969,172, filed Oct. 1, 2001 now U.S. Pat. No. 6,899,329.

BACKGROUND OF THE INVENTION

1. Field of Invention

The present invention relates to a gaming device that allows a player to use a telephone as a part of the game.

2. Description of Related Art

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Games

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

Display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

Display devices also tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds.

What has long been needed is a gaming device that adds to player satisfaction and enjoyment leading to longer playing times. Another long felt need is for a gaming device that allows the game player to utilize physical objects to interact with the game while at the same time providing for a random outcome of the game.

SUMMARY OF INVENTION

1. Advantages of the Invention

One of the advantages of the present invention is that it provides a gaming device that adds to player satisfaction and excitement.

An additional advantage of the present invention is that it provides a gaming device that allows a game player to interact with the gaming device.

An advantage of the present invention is that it provides a gaming device that allows interaction with a physical object that does not have an impact on the outcome of the game.

A further advantage of the present invention is that it provides a gaming device that allows a game player to use a telephone during the game.

Another advantage of the present invention is that it provides a gaming device that allows a game player to select a telephone call recipient.

Another advantage of the present invention is that it provides a gaming device that generates a multiplier to provide larger prizes.

An additional advantage of the present invention is that it provides a gaming device that displays the multiplier to the game player.

Another advantage of the present invention is that it provides a gaming device that can be used as a primary game or a bonus game.

A further advantage of the present invention is that it provides a gaming device that is attractive and entertaining to a game player.

Another advantage of the present invention is that it provides a gaming device that requires no human operators.

These and other advantages of the present invention may be realized by reference to other portions of the specification, claims, and abstract.

2. Brief Description of the Invention

The present invention comprises a gaming device. The gaming device allows the game player to initiate a game sequence by placing or simulating the placement of a telephone call. A controller generates a base prize in response to receiving the telephone call. Several telephone call recipients are displayed to the game player. One of the telephone call recipients is selected to receive the telephone call. The prize is announced over the telephone to the game player by the telephone call recipient. The controller generates a multiplier. The controller multiplies the base prize by the multiplier to obtain a total prize that is awarded to the game player.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

Gaming Device

Figure 1:
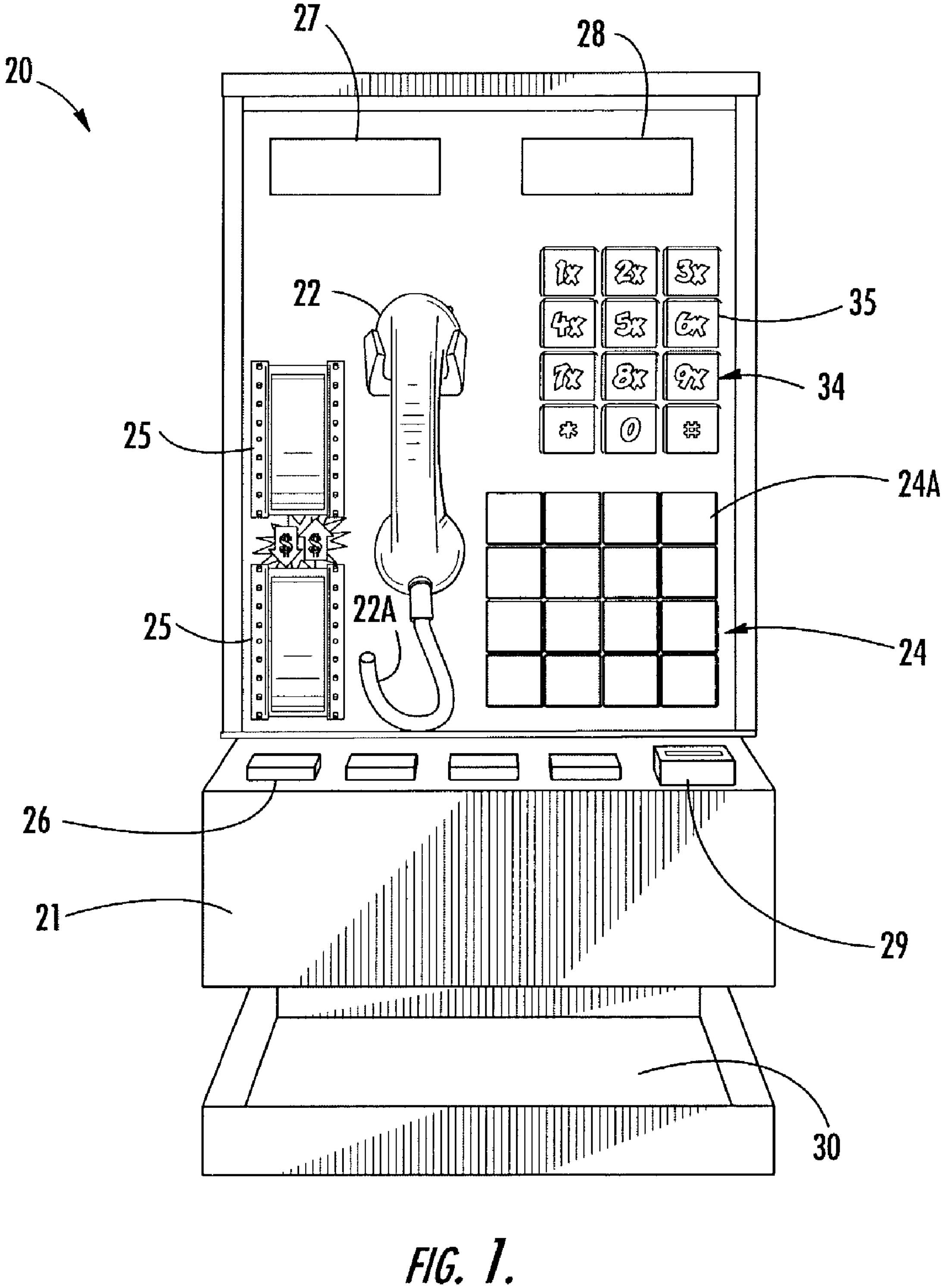
FIG. 1 is substantially a front view of the gaming device of the present invention.

As seen in FIG. 1, the present invention comprises a gaming device, generally indicated by reference number 20. Gaming device 20 comprises a chassis 21, a telephone 22, a telephone recipient display 24, spinning reels 25, selector buttons 26, a multiplier display 34, a base award or prize display 27, a total award or prize display 28, a coin slot or card reader 29 for accepting wagers and a coin dispenser 30 for awarding prizes.

In order to play gaming device 20, a game player deposits a wager into coin slot 29. Other forms of currency, vouchers or credit may be used in conjunction with gaming device 20 as is well known in the art. Gaming device 20 may also include a virtual bank to store credits that would be played on gaming device 20. The game player then can depress one of buttons 26 or pick up telephone 22 to start a telephone call. If the player depresses button 26 to start the call, telephone 22 can be fixed in place or can be an image of a telephone. If the player picks up telephone 22, then telephone 22 can be a conventional telephone such as is found in a telephone booth. Telephone 22 can also be other types of telephones such as a wireless phone or a table phone. Telephone 22 can be electrically and mechanically attached to gaming device 20 by a shielded cable or telephone cord 22A. The telephone is supplied with a dial tone like a regular telephone.

Telephone recipient display 24 shows several images 24A of people or telephone call recipients that may be called on telephone 22. For example, images 24A can be a stockbroker, a banker, a loan officer, a policeman, a lawyer, a doctor, a movie star or a government official. Preferably, gaming device 20 decides which of images 24A is to be called. Alternatively, the game player may be allowed to choose which of images 24A is called using selector buttons 26. Display 24 could also be a touch screen display in which the game player touches the image of the person who is desired to be called.

Gaming device 20 decides which of images 24A is to be called by using a pair of spinning reels 25. Starting the telephone call causes the two spinning reels 25 to begin to spin. Reels 25 have indicia thereon of images 24A, i.e. the stockbroker, banker, loan officer, policeman, lawyer, doctor, movie star or government official. The two spinning reels 25 will stop on a common image 24A indicating the selected telephone call recipient. The spinning reels are controlled by a controller 202 (see FIG. 2).

The telephone includes a speaker (not shown) to allow the game player to hear telephone sounds or voices. The telephone can ring if desired. The selected telephone call recipient announces on the telephone, to the player, a base award or prize that they have won. In addition to announcing the base prize, the telephone call recipient may provide commentary, jokes, music or other audio forms of entertainment to the game player. The base award is shown to the game player on base award display 27. Base award display 27 can be a conventional meter or a video display.

After the base award has been determined, gaming device 20 initiates a second phone call. A second phone number is dialed. A multiplier display or telephone keypad 34 has several keys 35 that light up to indicate the numbers that are dialed. Keys 35 have indicia thereon that indicates a multiplier. Keys 35 are shown with indicia of 1× through 10×. The last digit of the telephone number dialed remains lit to indicate the selected multiplier on one of keys 35. The selected multiplier can be announced over the telephone 22 to the game player.

The multiplier is multiplied by the base award to obtain a total award or prize. The total award is shown to the player on total prize display 28. If desired, the total award can be announced over the telephone 22 to the game player. The use of a multiplier allows for larger prizes to be awarded. The total prize is then awarded to the player by coin dispenser 30. If the last digit of the phone number dialed is zero, gaming device 20 may award a consolation prize or select a multiplier other than zero to be multiplied by the base award.

Figure 2:
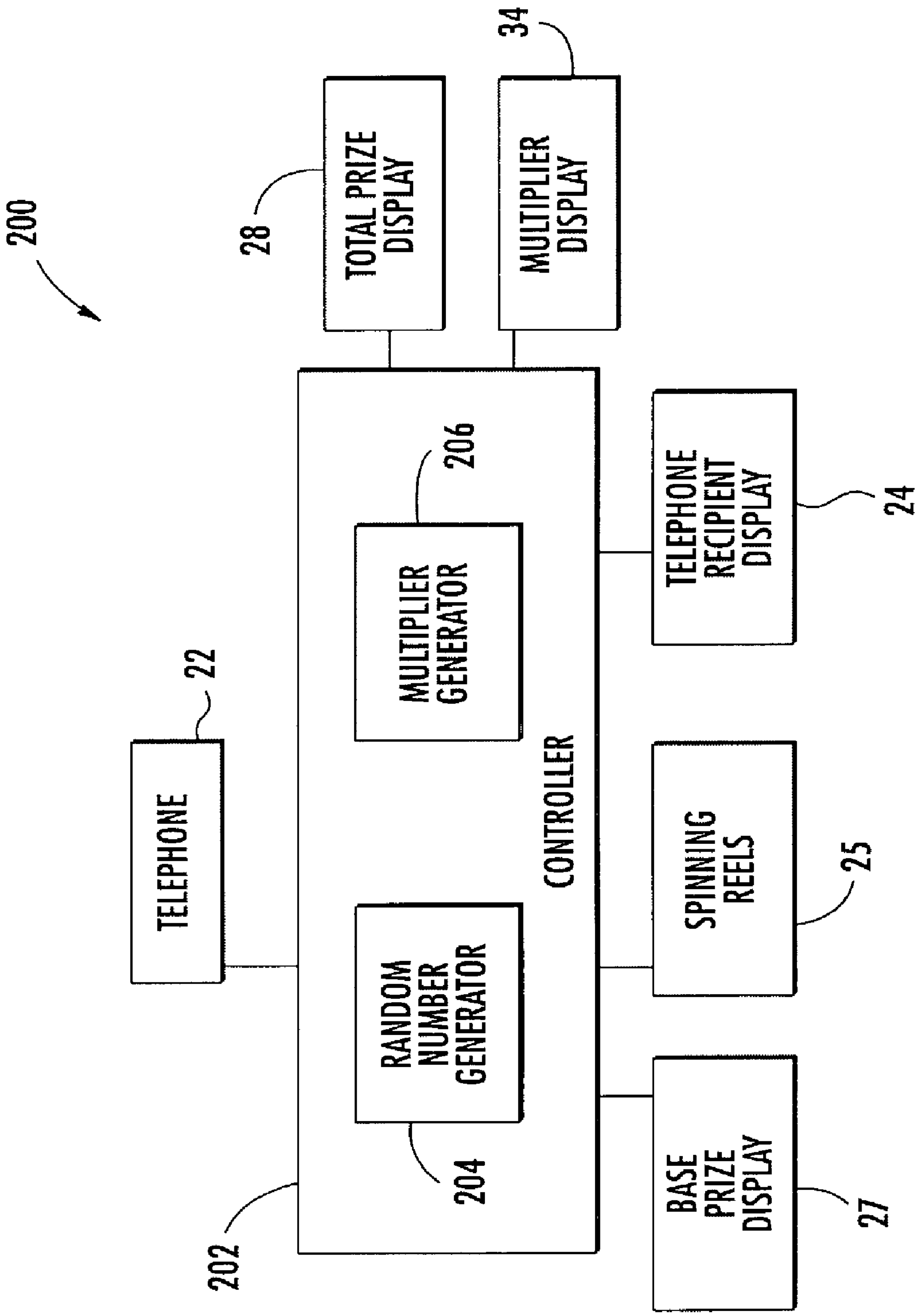
FIG. 2 is substantially a schematic diagram of the gaming device of the present invention.

Turning now to FIG. 2, a schematic diagram 200 of the gaming device 20 of the present invention is shown. Gaming device 20 has a controller or processor 202. Controller 202 comprises a random number generator 204 and a multiplier generator 206. The controller 202 controls communication with telephone 22. Controller 202 is in communication with telephone recipient display 24, multiplier display 34, base award or prize display 27, spinning reels 25 and total award or prize display 28. Controller 202 drives the displays and spinning reels. Controller 202 may be a single processor or a processor board.

The random number generator 204 produces a random or pseudo random number for each game. An award prize of the game may be determined by comparing the random number to a table of outcomes stored in a memory and accessed by random number generator 204. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. It is recognized that gaming device 20 may operate in many other ways and still achieve the objects of the present invention.

Controller 202 receives the base award from random number generator 204. The base award is displayed on display 27. At this point, the multiplier generator 206 generates a multiplier. The multiplier is shown to the player on display 34. Controller 202 then calculates a total prize or award. The total award is equal to the base award multiplied by the multiplier. For example, if the base award is 5 and the multiplier is 10. The total award or prize would be 50. The total prize can be awarded in coins, dollars or credits. The total prize is shown on total prize display 28. The amount of the prize may be added to the player's credit meter or the prize may be dispensed from coin dispenser 30.

Video Display

Figure 3:
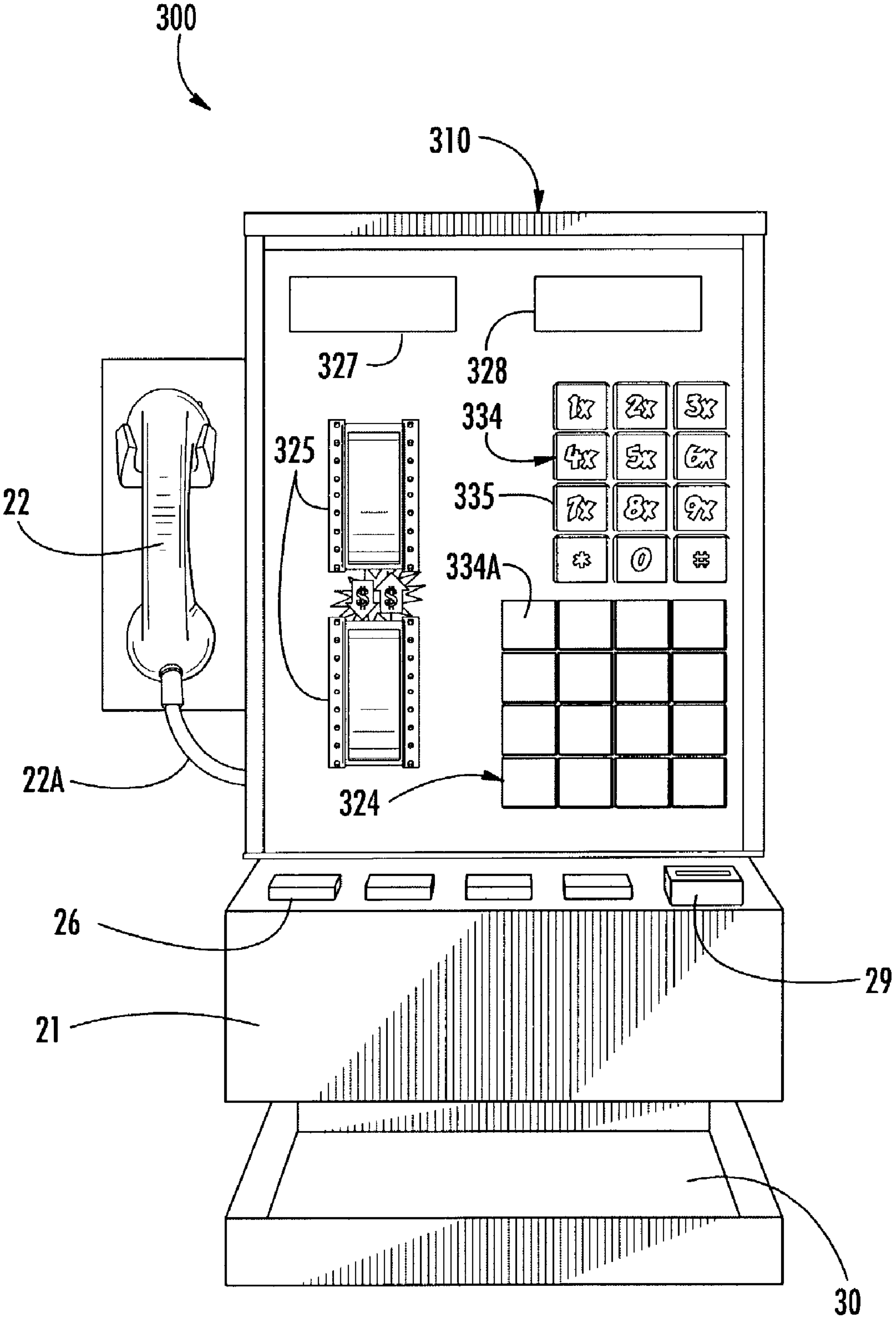
FIG. 3 is substantially a front view of the gaming device of the present invention utilizing a video display.

Referring to FIG. 3, a gaming device 300 is shown. Gaming device 300 comprises a video display 310, telephone 22 and chassis 21. Gaming device 300 is similar to gaming device 20 except that video display 310 replaces spinning reels 25, telephone recipient display 24, multiplier display 34, base award or prize display 27, and total award or prize display 28.

Video display 310 presents an image of the spinning reels 325, an image of telephone recipient display 324, an image of multiplier display 334, an image of base award or prize display 327, and an image of total award or prize display 328. Video display 310 may be any of a large number of display devices that are well known in the art. For example, video display 310 may be a cathode ray tube of a type that is used with many personal computers.

Video display 310 is in communication with controller or processor 202. Controller 202 transmits messages to video display 310 to request the display to produce different displays. For example, controller 202 may send a signal to video display 310 to spin reels 325 in response to a wager being placed or on a telephone call recipient being selected with selector button 26. The operation of gaming device 300 is the essentially the same as for gaming device 20.

Video display 310 may comprise a video controller (not shown) that drives the display device to present various displays. Many different well-known video controllers may be used. Software and data used to produce different presentations may be stored on the video controller in non-volatile memory, such as compact disks, magnetic disk drives, or erasable programmable read only memory (EPROM). Video display 310 may display other information in graphic and text form, such as instructions on how to use the gaming device. Speakers may also be provided for presenting audio information, such as sound effects or music when a prize is won.

This embodiment has the advantage of reducing maintenance because the moving parts of a mechanical display are eliminated. This embodiment also provides greater flexibility because many different kinds of presentations may be displayed on the video display 310.

Flow Chart

Figure 4:
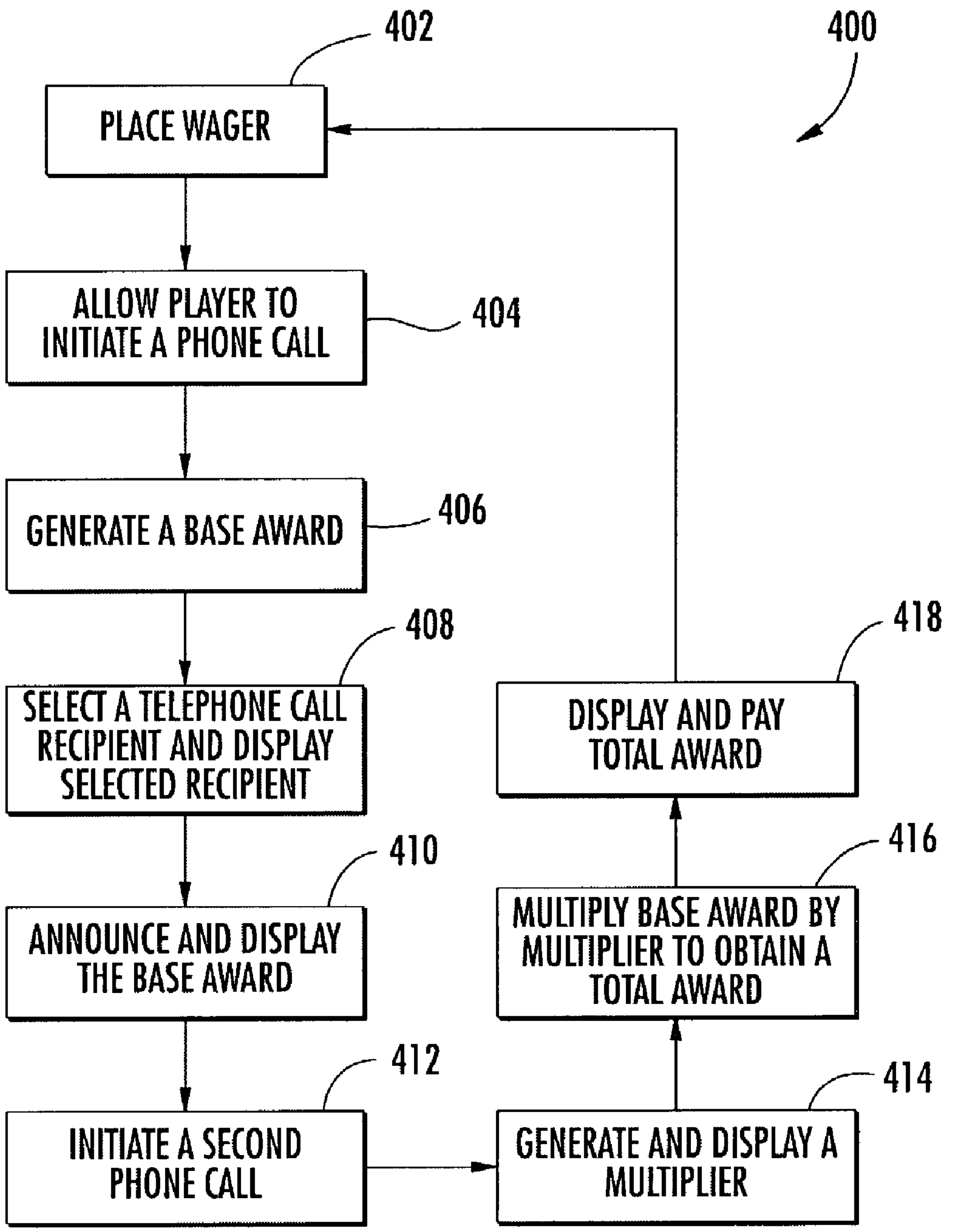
FIG. 4 is substantially a flow chart of the operation of the gaming device of the present invention.

Turning now to FIG. 4, a flowchart 400 of the operation of the gaming device 20 of the present invention is shown. The method includes allowing a game player to place a wager at step 402. Next, at step 404, the player is allowed to initiate a telephone call by depressing one of buttons 26 or lifting telephone 22. A base award or prize is generated at step 406 by controller 202. The base award is preferably randomly generated. At step 408, a telephone call recipient is selected using spinning reels 25, displayed to the game player and called. The selection of the telephone call recipient may be made by the game player or it may be generated by controller 202. The selected telephone call recipient announces to the game player the base award or prize at step 410. Next, gaming device 20 makes a second telephone call to a second telephone number at step 412. At step 414, a multiplier is generated and displayed to the game player. Preferably, the multiplier is the last digit of the second telephone number. The multiplier is multiplied by the base award to obtain a total award at step 416. Next, at step 418, the total award or prize is displayed and paid to the game player. Preferably, the prize is awarded in the form of credits that are added to a virtual bank. The game then returns to step 402 to allow the game player to play the game again by placing another wager. The method of flowchart 400 can provide a game player with an enjoyable gaming experience in which they are able to participate in the game using an object such as a telephone that does not influence the outcome of the game.

Bonus Game

Figure 5:
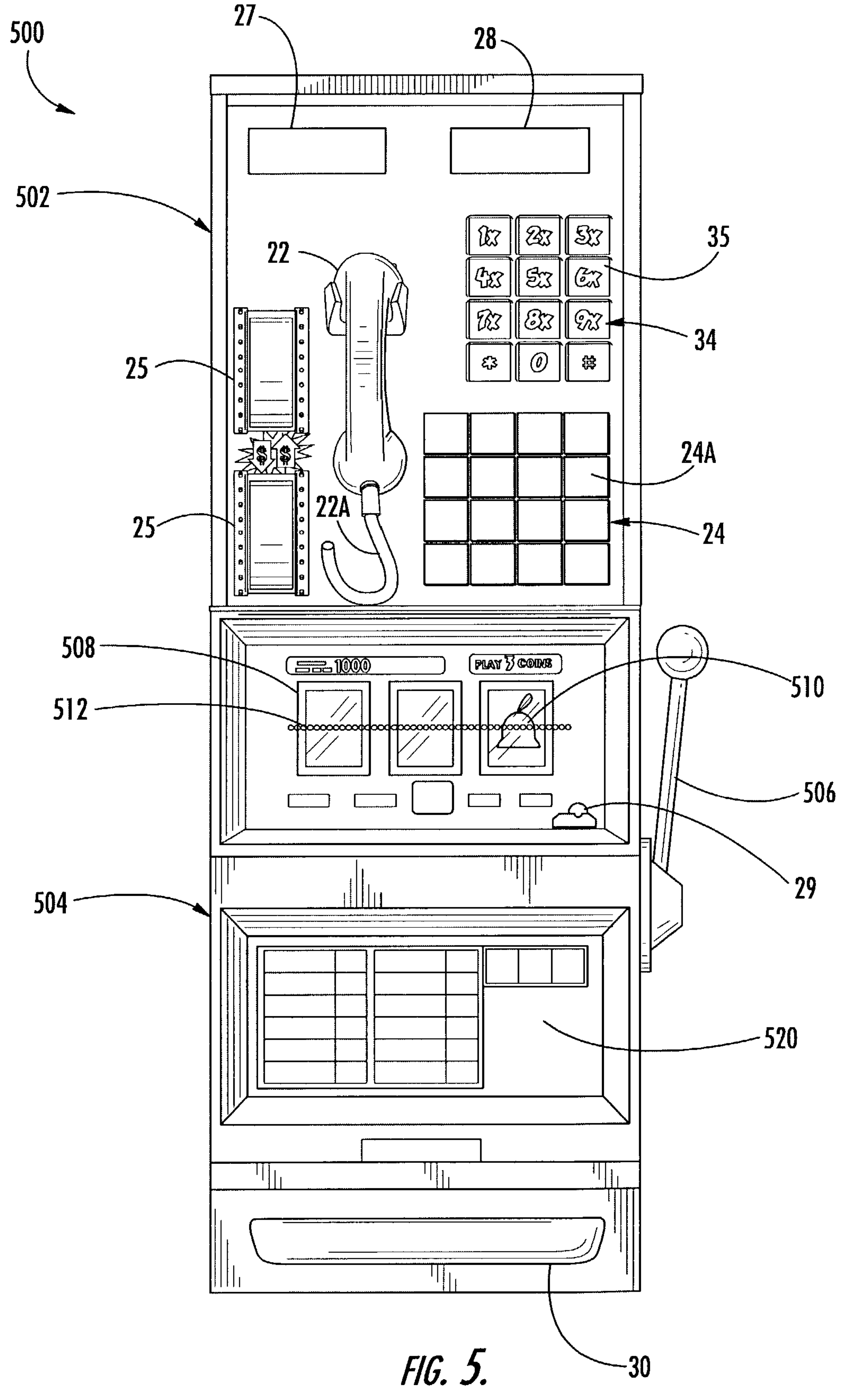
FIG. 5 is substantially a front view of the gaming device of FIG. 1 used as a bonus game in conjunction with a primary game.

As seen in FIG. 5, the present invention can also be used as a bonus game. Bonus gaming device 500 comprises a bonus game 502 mounted on top of a primary game 504. Primary game 504 may be any of a large number of devices that are adapted to allow players to play a game such as a slot machine. Bonus game 502 is similar in structure and operation to game apparatus 20 of FIG. 1.

Primary game 504 comprises lever 506, rotating reels 508, payline 512, display 520, coin acceptor 29 and coin dispenser 30. Lever 506 is used by a player to start the game after a wager has been placed in coin acceptor 29. Game 504 here is shown as a conventional rotating reel type slot machine. Rotating reels 508 have a bonus symbol 510. When bonus symbol 510 lines up on payline 512, a bonus-qualifying event has occurred and the bonus game 502 is started. Controller 202 (FIG. 6) is adapted to detect when a bonus-activating event occurs in primary game 504. This may be accomplished by primary game 504 transmitting a signal to controller 202 that a bonus event has occurred. In another embodiment, one or more sensors may be provided for determining if a bonus-activating event has occurred. For example, sensors may sense the positions of the reels on primary game 504. Sensors may also be provided external to primary game 504 to detect external bonus-activating events. Display 520 shows the prizes won from game play on primary game 504.

Figure 6:
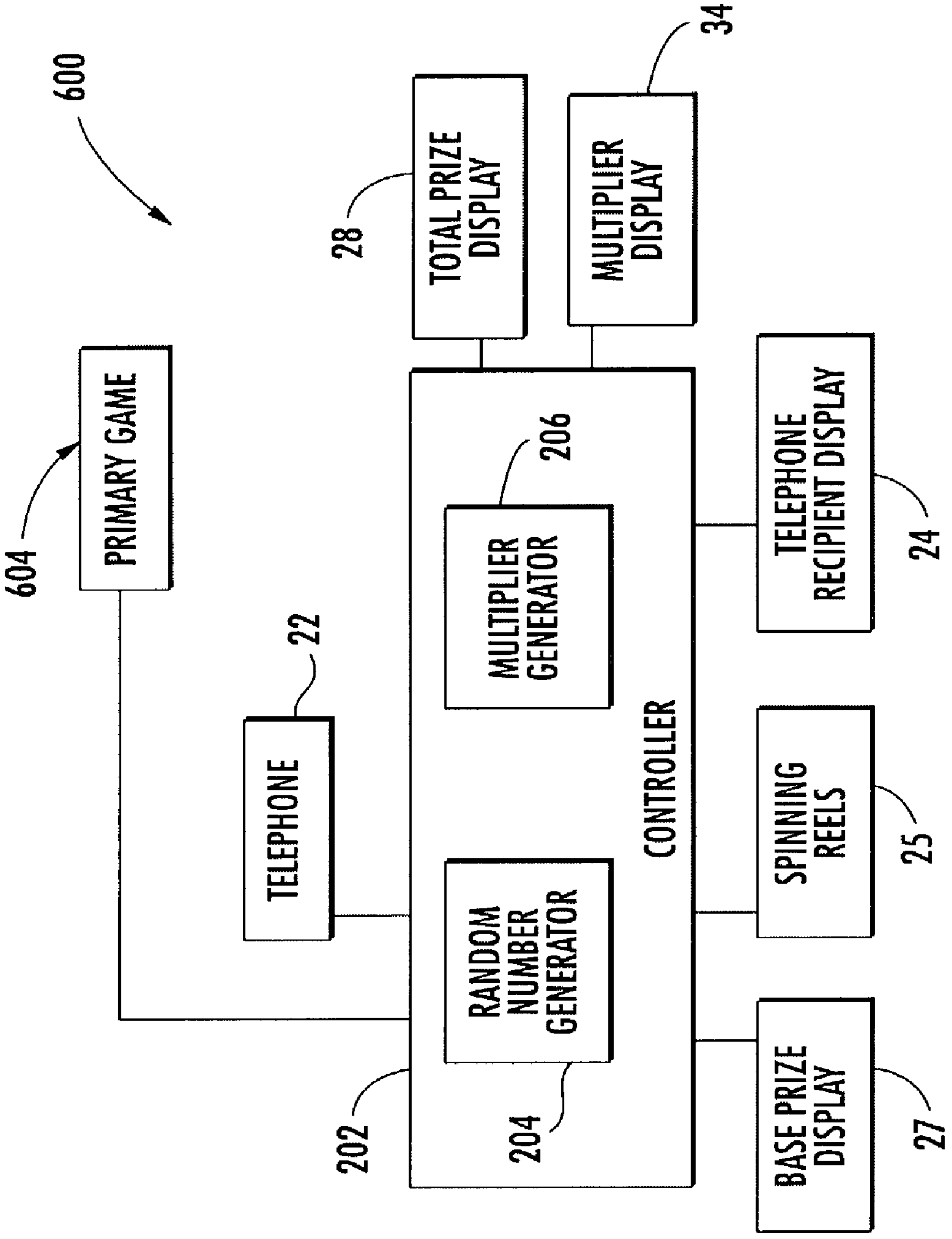
FIG. 6 is substantially a schematic diagram of the bonus gaming device of FIG. 5.

Turning now to FIG. 6, a schematic diagram 600 of the bonus gaming device 500 of the present invention is shown. Gaming device 500 has a controller or processor 202. Controller 202 comprises a random number generator 204 and a multiplier generator 206. The controller 202 controls communications with telephone 22. Controller 202 is in communication with telephone recipient display 24, multiplier display 34, base award or prize display 27, spinning reels 25, total award or prize display 28 and primary game 504. Controller 202 drives the displays and spinning reels. Controller 202 may be a single processor or a processor board.

Bonus gaming device 500 may also be capable of producing a bonus-activating event. This event may be many different types of events. For example, a bonus-activating event may comprise obtaining a particular combination of symbols. Furthermore, a bonus-activating event may occur when a player accumulates a number of symbols or prizes over a number of separate game plays. For example, a bonus-activating event may occur when the player obtains three special symbols during a period of time. The bonus-activating event may be based on an external event. For example, a bonus-activating event may occur when a group of players obtain a certain result.

When controller 202 detects a bonus-activating event, it begins a bonus sequence by activating bonus game 502. Bonus game 502 is played in the same manner as for game apparatus 20 of FIG. 1. The game places a telephone call to a telephone call recipient who announces a base prize to the player. The base prize is shown on display 27. Bonus game 502 also places a second phone call to obtain a multiplier. The multiplier is shown on display 34. A total award is calculated, displayed on display 28 and paid with coin dispenser 30.

Bonus Game Flow Chart

Figure 7:
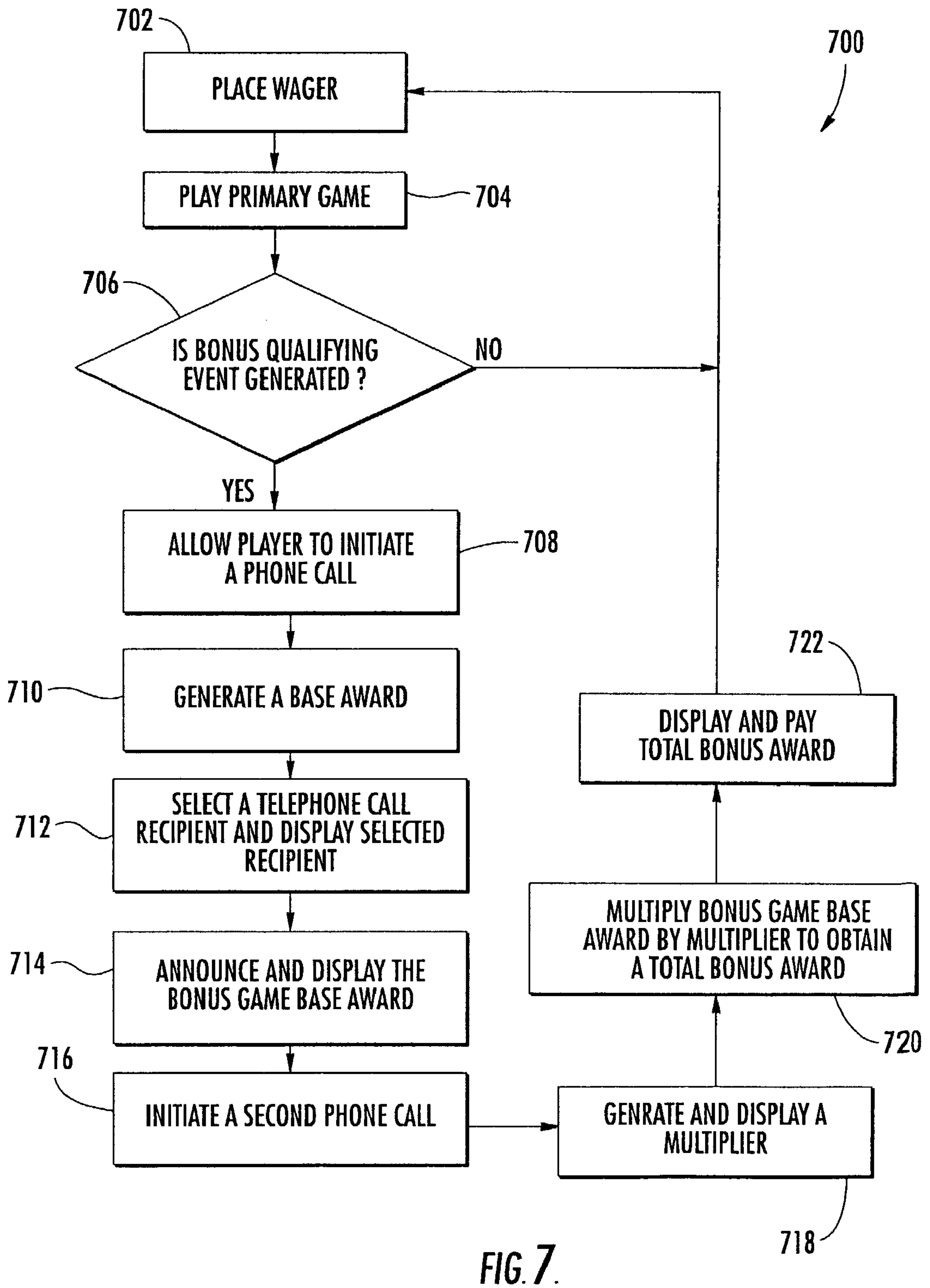
FIG. 7 is substantially a flow chart of the operation of the bonus game embodiment of FIG. 5.

Turning now to FIG. 7, a flowchart 700 of the operation of the bonus gaming device 500 is shown. The method includes allowing a game player to place a wager at step 702. At step 704, the game player is allowed to play a primary game 504. Game 504 can be one of many games such as a conventional slot machine. Primary game 504 can generate a bonus qualifying event or signal. At decision step 706, a bonus-qualifying event is checked to see if it has occurred. If the bonus-qualifying event has not occurred, the game loops back to step 702 to allow the game player to place another wager and play primary game 504. The primary game 504 continues until the bonus-qualifying event occurs. If the bonus-qualifying event has occurred, the game moves to step 708. At step 708, bonus game 502 is activated and the player is allowed to initiate a telephone call by depressing one of buttons 26 or lifting telephone 22. A base award or prize is generated at step 710 by controller 202. The base award is preferably randomly generated. At step 712, a telephone call recipient is selected using spinning reels 25, displayed to the game player and called. The selection of the telephone call recipient may be made by the game player or it may be generated by controller 202. The selected telephone call recipient announces to the game player the base award or prize at step 714. Next, bonus gaming device 502 makes a second telephone call to a second telephone number at step 716. At step 718, a multiplier is generated and displayed to the game player. Preferably, the multiplier is the last digit of the second telephone number. The multiplier is multiplied by the base award to obtain a total award at step 720. Next, at step 722, the total award or prize is displayed and paid to the game player. Preferably, the prize is awarded in the form of credits that are added to a virtual bank. The game then returns to step 702 to allow the game player to play the game again by placing another wager. The method of flowchart 700 provides a game player with an enjoyable bonus gaming experience in which they are able to participate in the game using a physical object such as a telephone that allows the game to have a randomly generated outcome.

One of the advantages of providing the game discussed above is to increase the excitement and enjoyment of playing the gaming device. Not only is the game entertaining to view, but it also increases the excitement and enjoyment experienced by a game player.

CONCLUSION

It can now be seen that the present invention solves many of the problems associated with the prior art. The present invention provides a gaming device that allows a game player to utilize a telephone to receive prize information. The present invention provides a gaming device that allows the game player to participate in the selection of a prize announcer while at the same time not having an effect on the game outcome.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of playing a game by a game player comprising, not necessarily in the order shown, except that step C occurs prior to steps D and E:

(A) providing a video display device, the video display device being adapted to display an image of the game;

(B) determining a prize;

(C) providing a telephone;

(D) allowing the game player to make a telephone call, wherein the video display device shows a plurality of recipients of the telephone call; and (E) announcing to the game player the prize over the telephone.

2. The method of playing a game according to claim 1, wherein the game player is allowed to select the telephone call recipient.

3. The method of playing a game according to claim 1, wherein a gaming device is allowed to select the telephone call recipient.

4. The method of playing a game according to claim 3, wherein the telephone call recipient has a plurality of possible responses.

5. The method of playing a game according to claim 1, further comprising generating a multiplier; calculating a total prize, the total prize being the prize multiplied by the multiplier; and displaying the prize, the multiplier and the total prize on the video display device.

* * * * *